United States Patent
Exton

(10) Patent No.: US 10,117,319 B2
(45) Date of Patent: Oct. 30, 2018

(54) METHOD AND SYSTEM FOR GENERATING PLASMA IN AN ATMOSPHERE

(71) Applicant: Reginald J Exton, Williamsburg, VA (US)

(72) Inventor: Reginald J Exton, Williamsburg, VA (US)

( * ) Notice: Subject to any disclaimer, the term of this patent is extended or adjusted under 35 U.S.C. 154(b) by 264 days.

(21) Appl. No.: 15/331,183

(22) Filed: Oct. 21, 2016

(65) Prior Publication Data

US 2018/0263103 A1    Sep. 13, 2018

(51) Int. Cl.
*H05H 1/46* (2006.01)
*B64C 23/00* (2006.01)
*H01S 3/16* (2006.01)

(52) U.S. Cl.
CPC .............. *H05H 1/46* (2013.01); *B64C 23/005* (2013.01); *B64C 2230/12* (2013.01); *H01S 3/1625* (2013.01); *H01S 3/1636* (2013.01); *H05H 2001/4607* (2013.01)

(58) Field of Classification Search
USPC ................................ 250/503.1, 494.1, 493.1
See application file for complete search history.

(56) References Cited

U.S. PATENT DOCUMENTS

| | | |
|---|---|---|
| 6,527,221 B1 | 3/2003 | Kremeyer |
| 2004/0120844 A1* | 6/2004 | Tribelsky .............. A61L 2/0082 422/2 |

OTHER PUBLICATIONS

Exton et al., "On-board projection of a microwave plasma upstream of a Mach 6 bow shock," Physics of Plasmas, vol. 8, No. 11, Nov. 2001, pp. 5013-5017.

Tang et al., "Resonant Enhanced Multiphoton Ionization of Neutral Argon," American Institute of Aeronautics and Astronautics AIAA 99-3669, 30th Plasmadynamics and Lasers Conference, Norfolk, VA. 1999.

* cited by examiner

*Primary Examiner* — Kiet T Nguyen
(74) *Attorney, Agent, or Firm* — Peter J. Van Bergen

(57) ABSTRACT

A method is provided for generating a region of plasma in a gaseous atmosphere that includes argon. A laser beam from a Ti:sapphire laser is directed into the gaseous atmosphere such that a portion of the argon along the laser beam is ionized. Microwave energy is directed into the ionized region of the laser beam to generate a plasma.

23 Claims, 2 Drawing Sheets

METHOD AND SYSTEM FOR GENERATING PLASMA IN AN ATMOSPHERE

STATEMENT OF GOVERNMENT INTEREST

The invention herein may be manufactured and used by or for the United States Government for United States Government purposes without payment of any royalties thereon or therefore.

FIELD OF THE INVENTION

The invention relates generally to plasma generation, and more particularly to a method and system for generating plasma in one or more regions of an atmosphere.

BACKGROUND OF THE INVENTION

The modification or reduction of a shock wave occurring forward of an aircraft has been studied for years. A variety of systems or methods have been tested with some degree of success. For example, pointed spike structures have been mounted on the nose of an aircraft in an effort to break up the shock wave. However, physical or mechanical spikes are limited by their practical lengths, only provide a single point of penetration of a shock wave, and are not adjustable to changing conditions. Shock wave modification has also been attempted using a laser beam to generate an optical spike that is directed through a shock wave. The problems with this approach are similar to those associated with mechanical spikes. Another proposed shock modification approach suggests that plasmas might be generated forward of an aircraft as a means to modify/reduce the effects of shock waves. While the plasma approach shows promise, the problems associated with plasma generation include the generally high-power systems needed to generate an effective shock mitigating plasma as well as the ability to position the plasma for optimum shock wave modification/reduction.

SUMMARY OF THE INVENTION

Accordingly, it is an object of the present invention to provide a method and system for generating a region of plasma in an atmosphere.

Another object of the present invention is to provide a method and system for generating a region of plasma in air at one or more desired locations.

Other objects and advantages of the present invention will become more obvious hereinafter in the specification and drawings.

In accordance with the present invention, a method for generating a region of plasma in a gaseous atmosphere is provided. The gaseous atmosphere includes argon as a constituent thereof. A laser beam from a Ti:sapphire laser in resonance with argon is directed into the gaseous atmosphere such that at least a portion of the argon in the gaseous atmosphere along the laser beam is ionized to liberate free argon electrons. Microwave energy focused into the laser beam interacts with the free argon electrons to generate a region of plasma.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
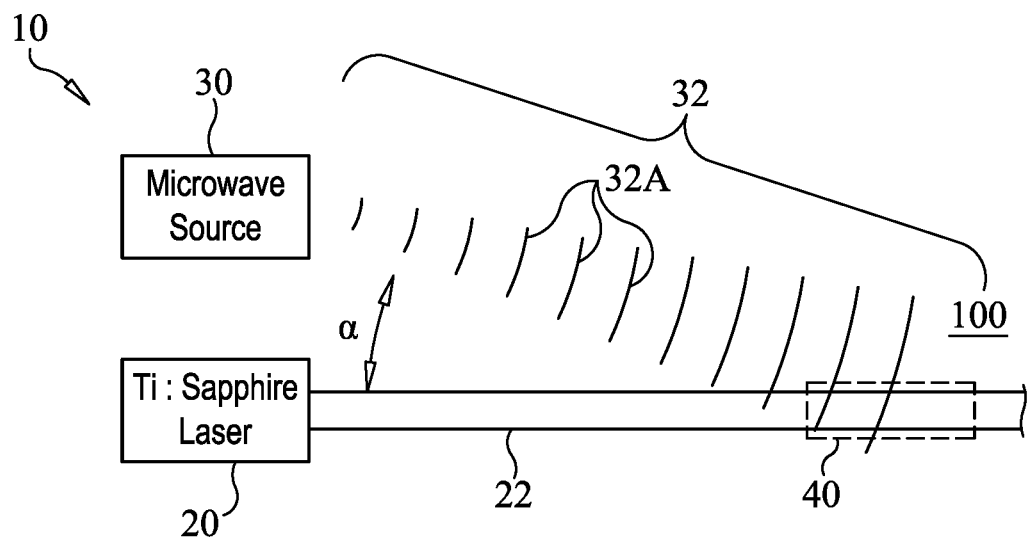
FIG. 1 is a schematic view of a system for generating a region of plasma in an atmosphere in accordance with an embodiment of the present invention.

Referring now to the drawings and more particularly to FIG. 1, a system for generating a region of plasma in an atmosphere in accordance with an embodiment of the present invention is shown and is referenced generally by numeral 10. In general, system 10 generates a region of plasma 40 in a gaseous atmosphere 100 that is exclusively argon or includes argon as a consistent element thereof. For example, atmosphere 100 can be an ambient and uncontained air environment. However, it is to be understood that atmosphere 100 can also be a contained gaseous environment that is completely argon or whose elemental constituents include argon. System 10 can be a stationary system, can be a moving system, or can be included on a moving vehicle (e.g., aircraft) without departing from the scope of the present invention.

Plasma generating system 10 includes a Ti:sapphire laser 20 and a microwave source 30. In accordance with the present invention, laser 20 generates a laser beam 22 directed along a path (e.g., a straight beam path) and into gaseous atmosphere 100. In general, laser 20 is tuned to be in resonance with argon such that laser beam 22 ionizes argon (in atmosphere 100) along laser beam 22 whereby free electrons of argon are liberated along laser beam 22. Depending on the application, laser beam 22 can be an unfocused beam or a focused beam. If laser beam is an unfocused beam, ionization of argon and the resulting concentration of free argon electrons are fairly consistent all along the laser beam path. If laser beam 22 is a focused beam whose energy is greatest at a focal region of the beam, ionization of argon and the resulting concentration of free argon electrons are enhanced in the beam's focal region.

An efficient type of Ti:sapphire laser for ionization of argon is one tuned to implement the "three resonant plus one photon" process (also referred to as the "[3R+1] process") in order to generate a sufficient amount of free (argon) electrons for purposes of the present invention. In the [3R+1] process, three photons are generated to be in resonance with a specific set of argon energy levels plus one more photon is employed to push the action over the ionization limit. A suitable wavelength for the Ti:sapphire laser implementing the [3R+1] process and satisfying the above-described spectroscopic selection roles is 261.27 nanometers.

Microwave energy 32 from microwave source 30 is focused into a region 40 of the argon-ionized laser beam 22 in order to excite the free electrons liberated along laser beam 22. In the case where laser beam 22 is a focused laser beam having a focal region for enhanced free argon electron liberation, region 40 can coincide with the focal region of laser beam 22. The interaction of the microwave energy 32 with the free argon electrons in laser beam 22 occurring in region 40 (i.e., the absorption of the microwave energy by the free argon electrons) generates a plasma in region 40 in gaseous atmosphere 100. More specifically, the plasma in region 40 is initiated by the excitement of the free argon electrons in laser beam 22. Once a plasma is generated in region 40, the plasma can diffusively expand beyond the confines of region 40.

Microwave energy 32 can be in the form of a single pulse 32A or multiple, time-separated pulses 32A whose repetition rate is selected to deposit a greater amount of energy into region 40 thereby maintaining the plasma discharge. Microwave energy 32 could also be a continuous wave of energy without departing from the scope of the present invention. Excitation of the free argon electrons in laser beam 22 can be achieved using a variety of microwave frequency bands to include, for example, energetically strong microwaves in the L, X, or Ku microwave frequency bands.

Figure 2:
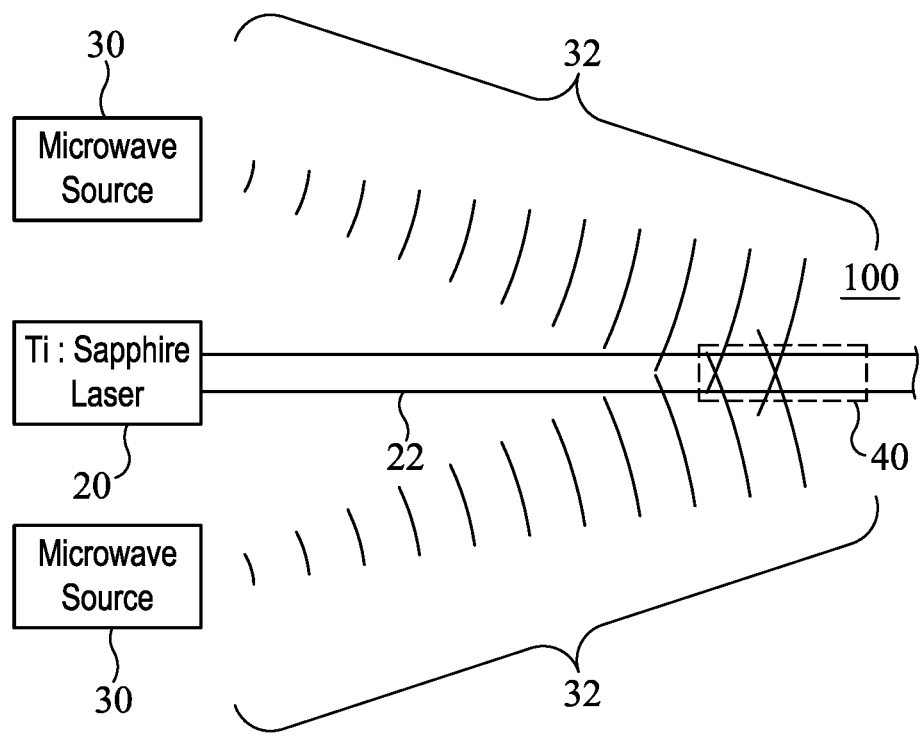
FIG. 2 is a schematic view of a system for generating a region of plasma in an atmosphere in accordance with another embodiment of the present invention.
Figure 3:
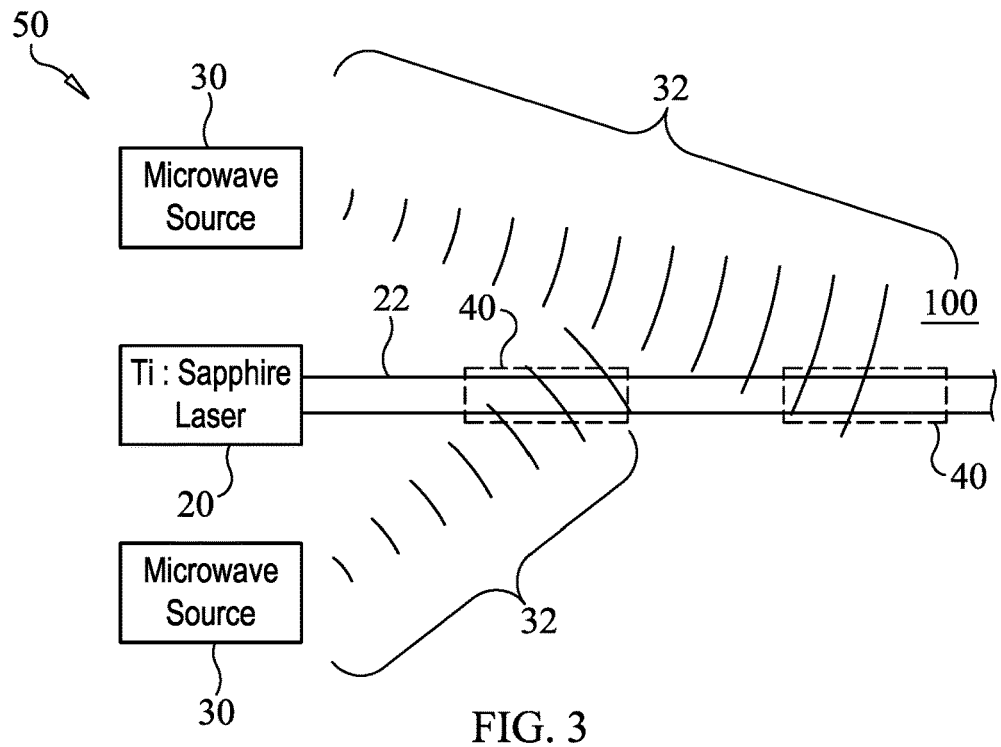
FIG. 3 is a schematic view of a system for generating multiple regions of plasma along a propagating laser beam in an atmosphere in accordance with still another embodiment of the present invention.

For the illustrated embodiment, microwave energy 32 propagates along a single path that is at a non-zero angle α with respect to the beam path of laser beam 22. In this way, the location of region 40 along laser beam 22 can be selected and adjusted by simply adjusting angle α. However, the present invention is not so limited as illustrated by the embodiments depicted in FIGS. 2-3 where additional microwave sources could be used to enhance the generation of a single plasma region (FIG. 2) and/or generate additional plasma regions along laser beam 22 (FIG. 3). For example and referring first to FIG. 2, one (or more) additional microwave source(s) 30 could be used to focus additional microwave energy 32 at region 40. The angles that the various microwave energies make with the beam path of laser beam 22 can be the same or different without departing from the scope of the present invention.

The present invention is not limited to the generation of one isolated region 40 along laser beam 22 as described above. For example and as shown in FIG. 3, another plasma generating system 50 in accordance with the present invention configures or positions multiple microwave sources 30 such that their respective microwave energy 32 is focused to interact with different portions of the beam path traversed by laser beam 22. In this way, multiple and separated regions 40 are defined thereby resulting in multiple regions of plasma being generated along the length of laser beam 22. The locations of the various regions 40 for plasma generation can be adjusted based on the requirements of a particular application.

Figure 4:
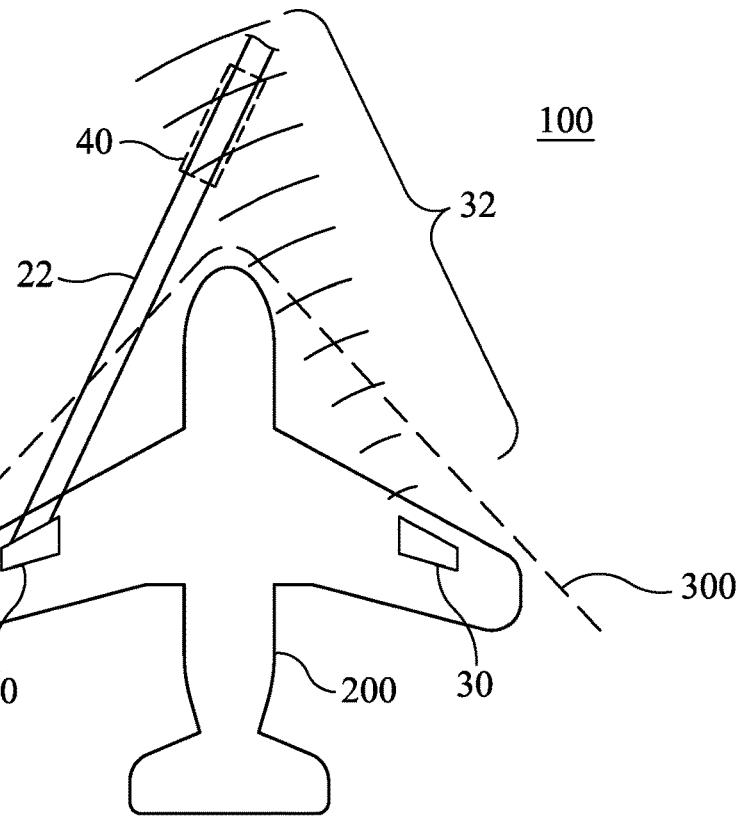
FIG. 4 is a schematic view of an aircraft equipped for bow shock modification in accordance with an embodiment of the present invention.

An exemplary application of the present invention will now be explained with the aid of FIG. 4 where a schematic view of an aircraft 200 flying through (air) atmosphere 100 generates a bow shock wave 300 forward of aircraft 200 as is known in the art. Mounted on one wing of aircraft 200 is laser 20 and mounted on the other wing of aircraft 200 is microwave source 30. Laser 20 and microwave source 30 are operated as described above to generate a plasma in region 40 forward of bow shock wave 300 to modify the shock wave's effects as aircraft 200 flies through atmosphere 100.

The advantages of the present invention are numerous. The simple laser and microwave combination provides for plasma generation in an atmosphere. The plasma region(s) can be tailored in size, strength, and location. The method lends itself to incorporation onboard an aircraft where the generated plasma region(s) can be located and adjusted for efficient shock wave modification/reduction at a variety of aircraft speeds.

Although the invention has been described relative to a specific embodiment thereof, there are numerous variations and modifications that will be readily apparent to those skilled in the art in light of the above teachings. For example, different laser sources could be used to generate free argon electrons for microwave absorption and plasma generation in accordance with the present invention. It is therefore to be understood that, within the scope of the appended claims, the invention may be practiced other than as specifically described.

What is claimed as new and desired to be secured by Letters Patent of the United States is:

1. A method for generating a region of plasma in an atmosphere, comprising the steps of:
    providing a gaseous atmosphere having argon as a constituent thereof;
    directing a laser beam from a Ti:sapphire laser into the gaseous atmosphere wherein at least a portion of the argon in the gaseous atmosphere along the laser beam is ionized; and
    focusing microwave energy into the laser beam wherein the microwave energy interacts with the laser beam to generate a region of plasma.

2. A method according to claim 1, wherein the microwave energy comprises at least one pulse thereof.

3. A method according to claim 1, wherein the microwave energy comprises a plurality of time-separated pulses of microwave energy having a repetition rate.

4. A method according to claim 1, wherein the laser beam is directed along a straight beam path.

5. A method according to claim 1, wherein the microwave energy propagates along at least one path at a non-zero angle relative to a beam path of the laser beam.

6. A method according to claim 1, wherein the microwave energy comprises microwaves selected from the group consisting of L-band microwaves, X-band microwaves, and Ku-band microwaves.

7. A method according to claim 1, wherein the laser beam has a wavelength of 261.27 nanometers.

8. A method according to claim 1, wherein the laser beam is focused at a focal region and the microwave energy is focused at the focal region.

9. A method for generating a region of plasma in an atmosphere, comprising the steps of:
    providing a gaseous atmosphere having argon as a constituent thereof;
    directing a laser beam along a straight beam path into the gaseous atmosphere, the laser beam being generated by a Ti:sapphire laser tuned to implement a [3R+1] process, the laser beam having a wavelength of 261.27 nanometers, wherein at least a portion of the argon in the gaseous atmosphere is ionized to liberate free electrons of argon along the laser beam; and
    focusing microwave energy into the laser beam wherein the microwave energy interacts with the free electrons of argon to generate a region of plasma.

10. A method according to claim 9, wherein the microwave energy comprises at least one pulse thereof.

11. A method according to claim 9, wherein the microwave energy comprises a plurality of time-separated pulses of microwave energy having a repetition rate.

12. A method according to claim 9, wherein the microwave energy propagates along at least one path at a non-zero angle relative to the straight beam path of the laser beam.

13. A method according to claim 9, wherein the microwave energy comprises microwaves selected from the group consisting of L-band microwaves, X-band microwaves, and Ku-band microwaves.

14. A method according to claim 9, wherein the laser beam is focused at a focal region and the microwave energy is focused at the focal region.

15. A method for generating a region of plasma in air, comprising the steps of:

directing a laser beam from a Ti:sapphire laser along a beam path and into a region of air having argon as a constituent thereof, wherein free electrons of argon are generated along the beam path; and focusing microwave energy into at least one region of the laser beam wherein the microwave energy is absorbed by the free electrons of argon in the at least one region of the laser beam to generate a region of plasma.

16. A method according to claim 15, wherein the microwave energy comprises at least one pulse thereof.

17. A method according to claim 15, wherein the microwave energy comprises a plurality of time-separated pulses of microwave energy having a repetition rate.

18. A method according to claim 15, wherein the beam path is straight.

19. A method according to claim 15, wherein the microwave energy propagates at a non-zero angle relative to the beam path.

20. A method according to claim 15, wherein the microwave energy comprises microwaves selected from the group consisting of L-band microwaves, X-band microwaves, and Ku-band microwaves.

21. A method according to claim 15, wherein the laser beam has a wavelength of 261.27 nanometers.

22. A method according to claim 21, further comprising the step of tuning the Ti:sapphire laser to implement a [3R+1] process.

23. A method according to claim 15, wherein the laser beam is focused at a focal region and the microwave energy is focused at the focal region.

* * * * *